United States Patent [19]

Cady

[11] Patent Number: 5,343,920
[45] Date of Patent: Sep. 6, 1994

[54] WHEEL ASSEMBLY WITH FLANGE SECURING AND PRESSURE RELIEVING MEANS

[75] Inventor: John M. Cady, Munroe Falls, Ohio

[73] Assignee: The Goodyear Tire & Rubber Company, Akron, Ohio

[21] Appl. No.: 750,163

[22] Filed: Aug. 26, 1991

[51] Int. Cl.$^5$ .............................................. B60B 25/04
[52] U.S. Cl. .................................. 152/396; 152/409
[58] Field of Search ............... 152/396, 397, 398, 402, 152/409, 410, DIG. 10, 411; 301/95-98, 13.2, 35.3, 36.1, 36.3

[56] References Cited

U.S. PATENT DOCUMENTS

| | | | |
|---|---|---|---|
| 2,428,551 | 10/1947 | Burger | 152/409 |
| 2,576,736 | 11/1951 | Watkins | 152/DIG. 10 |
| 2,802,508 | 8/1957 | Brink | 152/410 |
| 2,893,784 | 7/1959 | Delker | 301/36 R |
| 3,880,219 | 4/1975 | Mitchell | 152/DIG. 10 |
| 3,882,919 | 5/1975 | Sons, Jr. et al. | 152/410 |
| 4,165,777 | 8/1979 | Sano | 152/DIG. 10 |
| 4,369,826 | 1/1983 | Hendrickson | 152/410 |
| 4,407,348 | 10/1983 | Suckow | 152/410 |
| 4,481,997 | 11/1984 | Strader | 152/DIG. 10 |
| 4,823,854 | 4/1989 | Payne et al. | 152/382 |

FOREIGN PATENT DOCUMENTS

| | | |
|---|---|---|
| 0284507 | 9/1988 | European Pat. Off. . |
| 3738009 | 5/1989 | Fed. Rep. of Germany . |
| 8202518 | 8/1982 | PCT Int'l Appl. . |

Primary Examiner—Russell D. Stormer
Attorney, Agent, or Firm—David L. King

[57] ABSTRACT

A wheel assembly 10 for a tubeless pneumatic tire 11 is described. The wheel assembly 10 has a rim 12 for supporting the tire 11, a flange 14 removably attached to the rim 12, and a plurality of spaced studs 34 attached to the rim and threaded nuts 32 for securing the flange to the rim and for relieving pressurization from a mounted and inflated tire 11 in the event one of the threaded nuts 32 is loosened.

13 Claims, 7 Drawing Sheets

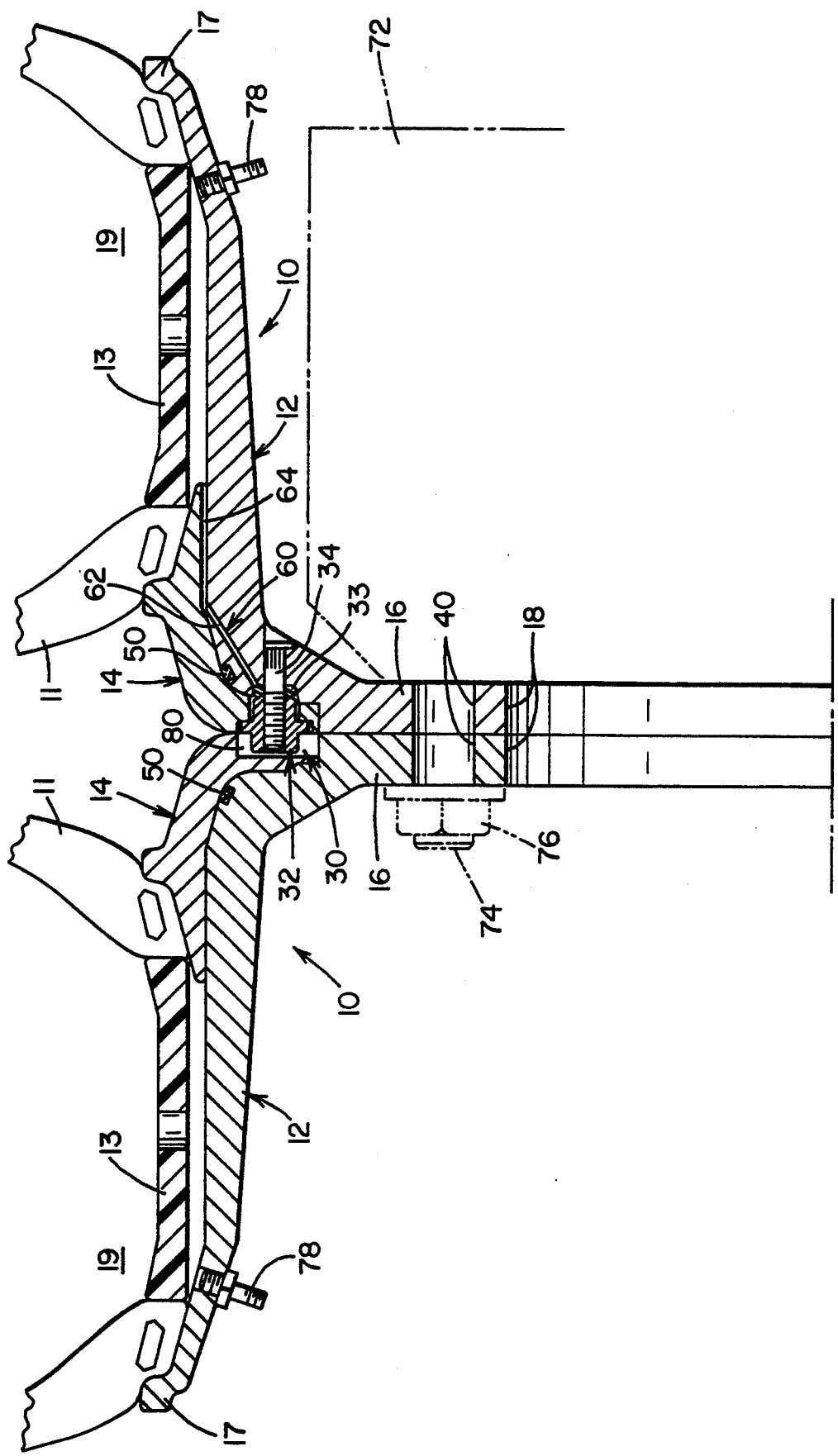

WHEEL ASSEMBLY WITH FLANGE SECURING AND PRESSURE RELIEVING MEANS

BACKGROUND OF THE INVENTION

This invention relates to a wheel assembly for tubeless pneumatic tires. In particular the invention relates to a wheel assembly having a rim, a removable flange, and a plurality of spaced means which will relieve pressure in the event one attempts to remove the flange from the rim while the tire is inflated.

Large tubeless pneumatic tires are commonly mounted on multi-piece rims. The multi-piece rim generally includes a rim with an integral bead seat flange and a detachable bead seat flange that is retained by a removable locking means, such as a lock-ring. The beads of the tire are retained between the two flanges and upon inflation the tire seals airtightly against the flanges. The lock-ring is seated in an annular groove formed in the rim thus locking the bead flange securely in position.

Tires mounted on multi-piece rims are inflated to high pressures in the range of 80 to 110 psi. The resultant forces at the bead restraining flanges are very high. Improper assembly of the rim or attempts to disassemble the wheel assembly while the tire is inflated can result in the detachable flange and lock rim dislodging and being thrown at high velocities.

Depressurization is provided if an attempt is made to remove the flange from an inflated wheel assembly of the invention when an inflated tire is mounted on it.

SUMMARY OF THE INVENTION

A wheel assembly 10 for a tubeless pneumatic tire 11 is described. The wheel assembly 10 comprises a rim 12 for supporting the tire 11, a flange 14 removably attached to the rim for engaging a bead area of the tire 11, and a plurality of spaced means 30. The assembled rim 12 and flange 14 together with the tire 11 form an airtight chamber 19 for pressurization. The plurality of spaced means 30 secure the flange to the rim 12 and relieve pressurization from a mounted and inflated tire in the event the flange 14 is loosened from the rim 12.

In a preferred embodiment, the rim 12 and flange 14 have a plurality of circumferentially spaced holes 20, 22. The holes 20 of the rim 12 are aligned with the holes 22 of the flange 14 to form a plurality of openings 25. The openings 25 extend from the flange 14 to the rim 12. The means 30 for securing and pressure relieving includes removable means 32 for applying axial force between the flange 14 and the rim 12. One of the removable means 32 is located in each of the respectively aligned flange and rim holes 20. The securing and pressure relieving means 30 further includes a plurality of airway passages 60 communicating with the air chamber 19 and the openings 25 and also includes means 33 for air tight sealing and unsealing of the airway passage 60 communicating with the opening 25 in which the removable means 32 is located upon secure assembly and disassembly of the flange 14 to the rim 12.

DETAILED DESCRIPTION OF THE FIGURES

FIG. 1 is a perspective view of the wheel assembly.

FIG. 2 is a plan view of the wheel assembly attached to a hub. The wheel assembly is shown with tire and bead retainer. The view has a portion of the wheel assembly cut away to illustrate various components of the assembly.

FIG. 10 is a cross-sectional view of a portion of a pair of wheel assemblies attached to a hub, illustrating a dual wheel mounting configuration.

DEFINITIONS

"Axial" and "axially" refer to lines or directions that are parallel to the axis of rotation of the wheel assembly.

"Bead" means that part of the tire comprising an annular tensile member wrapped by ply cords and shaped, with or without other reinforcement elements such as slippers, chippers, apexes, toe guards and chafers, to fit the design rim.

"Circumferential" means lines or directions extending along the perimeter of the surface of the annular rim perpendicular to the axial direction.

"Lateral" means an axial direction.

"Radial" and "radially" are used to mean directions radially toward or away from the axis of rotation of the wheel assembly.

"Rim" means the metal support for the tire or tire and tube assembly on the wheel. The beads of a tire are seated on the rim.

DETAILED DESCRIPTION OF THE INVENTION

Figure 1:
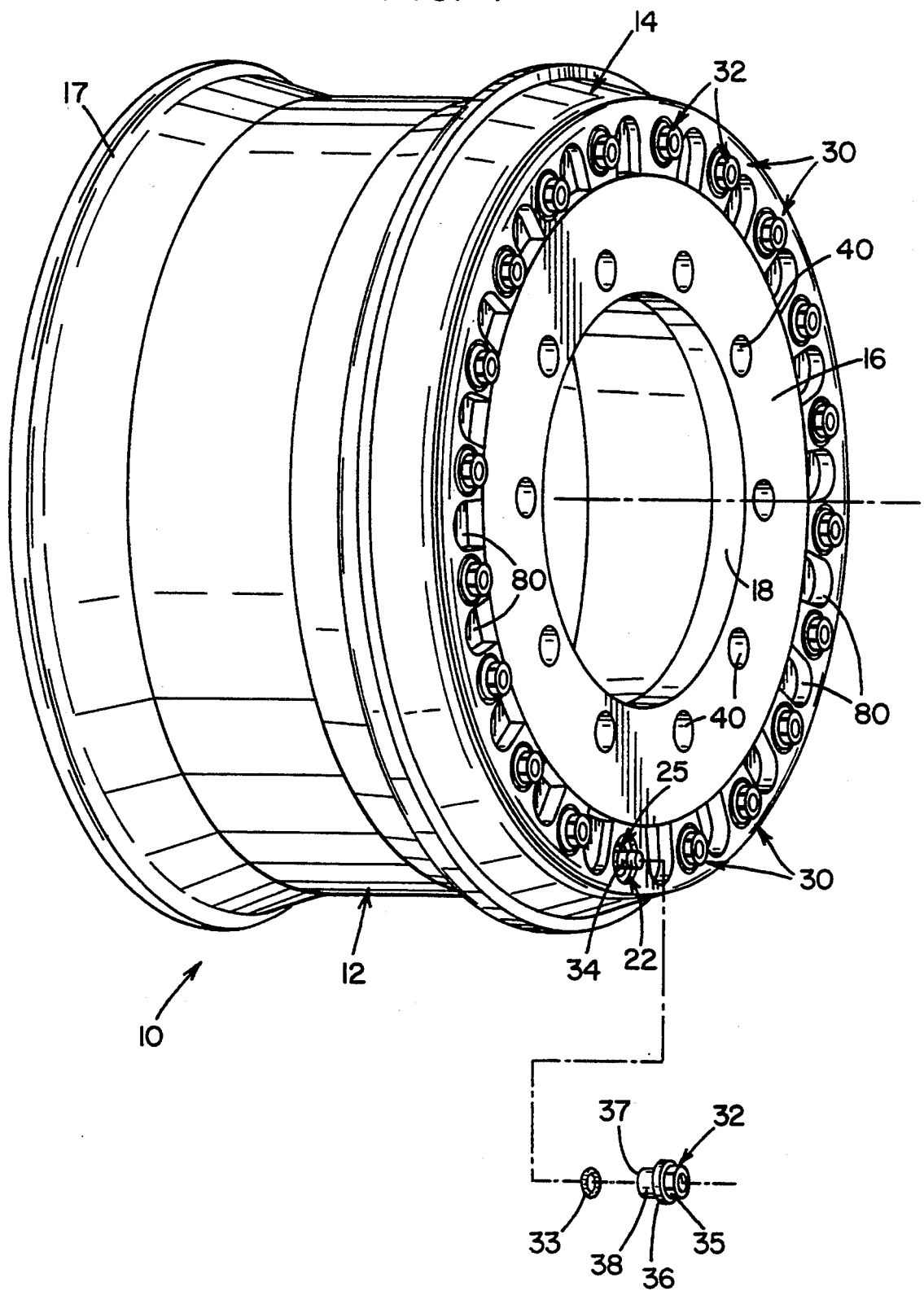

FIG. 1 illustrates a wheel assembly according to the present invention, the wheel assembly being designated by reference numeral 10.

The wheel assembly 10 includes a rim 12, a removable bead flange 14, and a plurality of spaced means 30 for securing the flange to the rim and for relieving pressurization from a mounted and inflated tire in the event the flange is loosened from the rim.

In the preferred embodiment as illustrated in FIG. 1, the spaced means 30 includes a removable means 32; one such means is shown detached from the wheel assembly 10. The detached removable means 32 is shown with an elastomeric "0"-ring 33. The "0"-ring 33 fits over a threaded stud 34 and is positioned between the rim 12 and the removable means 32.

The rim 12 has an axial end 16 with a plurality of openings 40 for attaching the wheel assembly 10 to the hub of a vehicle. The flange 14 includes a plurality of holes 22 which, when the flange is attached to the rim 12, align with the holes 20 in rim 12 thus forming openings 25 that extend through the wheel assembly 10. Projecting from the holes 20 in the rim 12 are a plurality of threaded studs 34 which extend through holes 22 of the flange 14 and thereby provide means for securing the flange 14 to the rim 12. The rim 12 also has a large center opening 18 at its axial end 16.

Positioned between the studs 34 are a plurality of slots. The slots 80 are provided to facilitate the mounting of a pair of wheel assemblies in a dual wheel mounting configuration.

Figure 2:
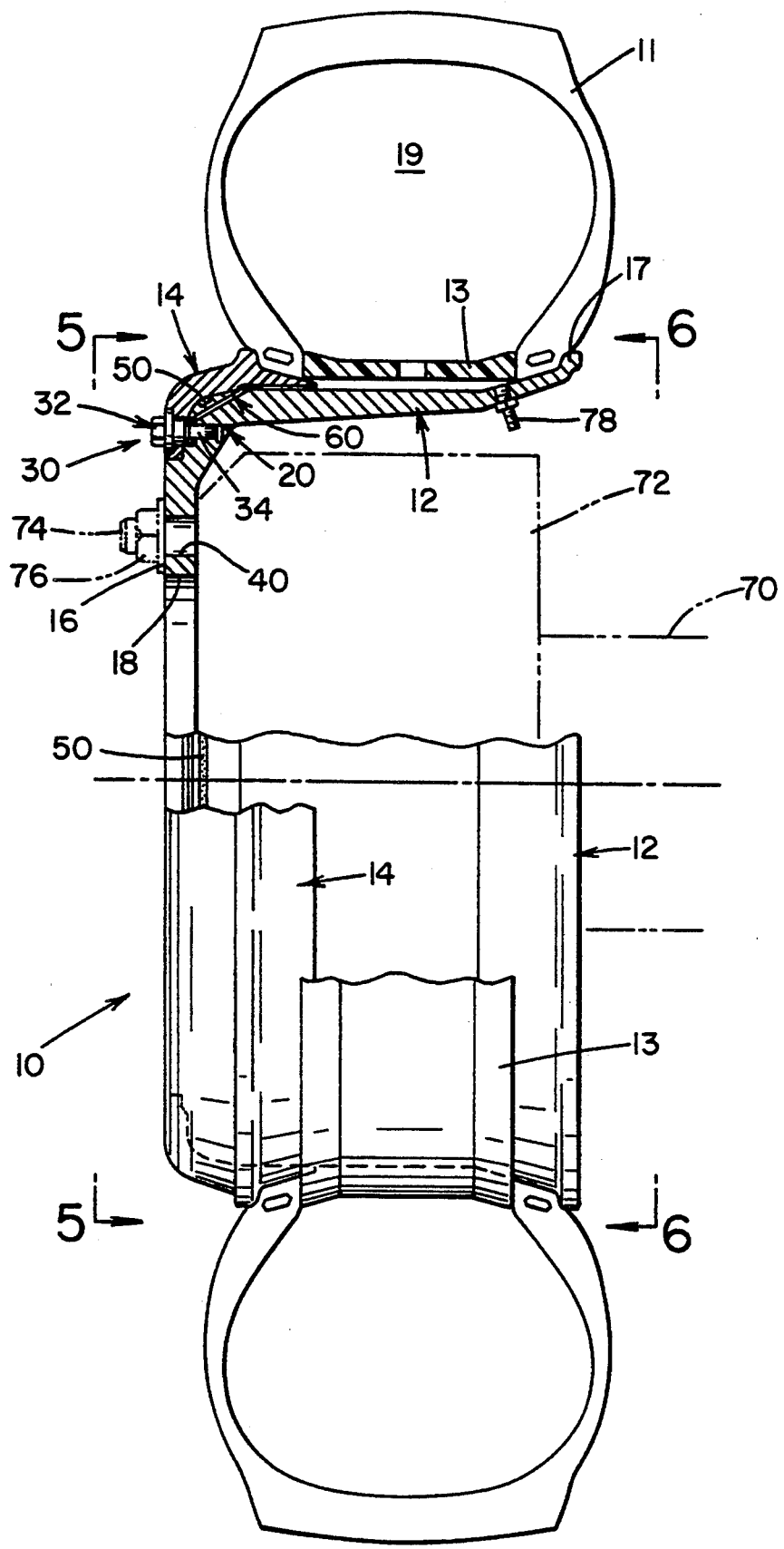

FIG. 2 illustrates the wheel assembly 10 with a tire 11 mounted. The tire 11 has a bead retaining device 13 positioned between the beads of the tire 11. The bead retaining device 13 as shown is described in U.S. Pat. No. 5,000,240. The device 13 is an optional component that can be used in conjunction with the wheel assembly 11 of the present invention. The phantom or dashed lines of FIG. 2 represent an axle 70 and a hub 72 of a vehicle. The hub has a plurality of threaded studs 74 that project through the openings 40 of the rim 12 to provide a means for securing the wheel assembly 10 to a vehicle by attachment of threaded nuts 76 to the studs 74.

An air inflation valve 78 is shown attached to the rim, the valve 78 being positioned between the beads of a tire 11 to facilitate inflation of the tire 11. The space between the inside of the tire 11 and the assembled flange rim forms an air tight chamber 19.

Figure 3:
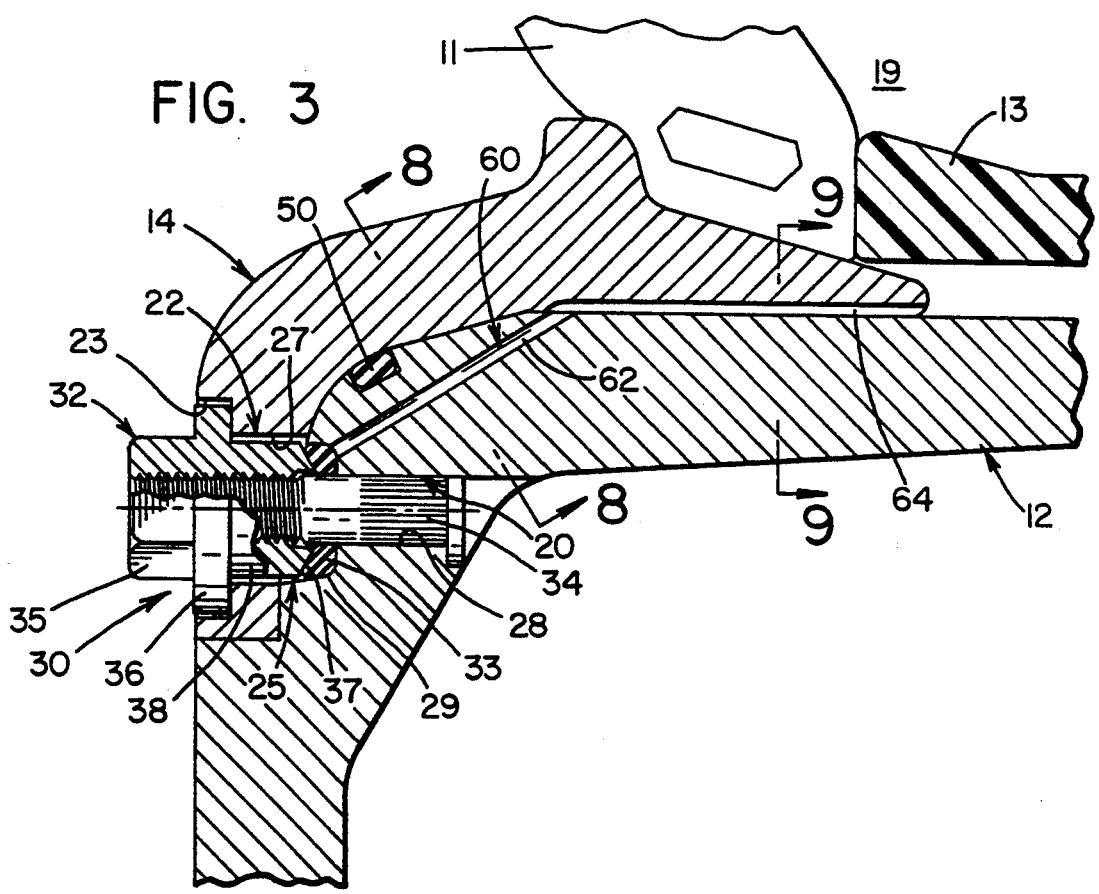
FIG. 3 is an enlarged view of a portion of the wheel assembly taken along lines 3—3 of FIG. 5.

A means 30 for securing and pressure relieving is shown in FIG. 2 and an enlarged view is shown in FIG. 3. The means 30 for securing and pressure relieving includes a threaded stud 34 press fit into the rim hole 20 and extending through the aligned flange hole 22. A removable means 32 for applying an axial force between the flange 14 and the rim 12 is shown. In the preferred embodiment the removable means 32 is a threaded nut. The nut 32 has a hexagonal shaped head 35 for tightening, a circular collar 36 for securing the flange, and a cylindrical extension 38 with a chamfered end 37. The chamfered end 37 contacts and compresses an elastomeric "0"-ring 33, the "0"-ring 33 being positioned over the stud 34. As the removable means 32 is advanced on the stud, collar 36 engages the flange 14, the flange 14 is forced against the rim 12, and the collar limits the travel of removable means 32. This travel limiting aspect assures that the "0"-ring 33 is not damaged during assembly.

Positioned between the removable flange 14 and the rim 12 is an annular sealing ring 50. The annular sealing ring ensures that the periphery of the flange 14 to rim 12 interface is sealed to allow air retention within a tire mounted on wheel assembly 11.

The securing and pressure relieving means 30 includes a plurality of air passages 60 communicating with the air chamber 19 and the openings 25 in which the removable means 32 are located. The means 30 also includes means 33 for air tightly sealing and unsealing the air passage 60. In the preferred embodiment the means 33 is a plurality of "0"-rings 33. As the removable means 32 is tightened upon assembly the "0"-ring 33 is compressed between the removable means 32 and the rim 12 and the compressed "0"-ring airtightly seals the air passage 60.

An air passage 60 is formed by a passage 60 in the rim 12, of circular cross-section, and by a slot 64 in the flange.

As illustrated in FIGS. 2–4 and 8 the circular passages 60, 62 extend from the opening 25, through the rim 12, to an area under the flange 14.

As illustrated in FIGS. 2–4 and 9 the flange includes a slot 64. The slots 64 are aligned with the circular passage 62 of the rim and extend from the air chamber 19 to the circular passage 62.

Figure 4:
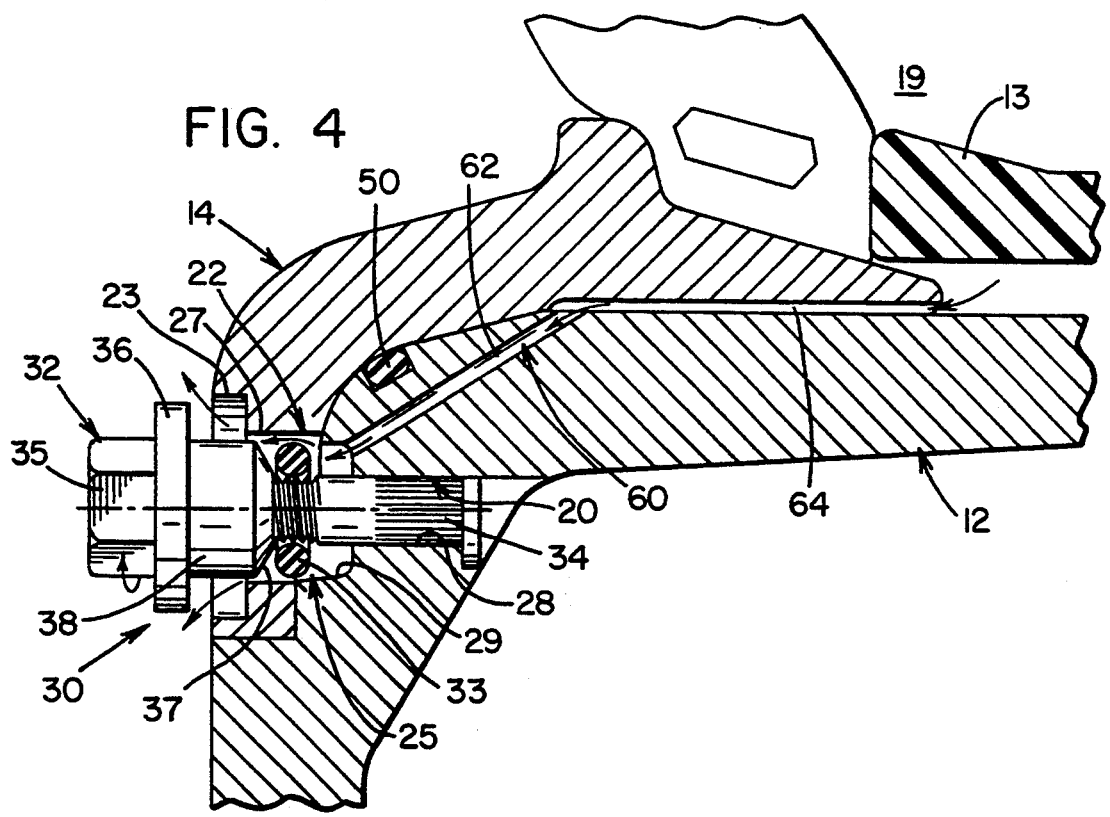
FIG. 4 is a further view of the portion of the wheel assembly shown in FIG. 3, the removable means 32 being illustrated in a loosened position.

As shown in the view of FIG. 4, upon loosening of the removable means 32 from the wheel assembly 10 with an inflated tire 11 mounted, the air pressure forces air through the air passage 60 as the chamfered end 37 is withdrawn relative to the rim 12. The "0"-ring 33 is forced from the sealed position and air rushes out initiating a depressurization of the tire 11.

In the preferred embodiment the cylindrical extension 38 of the removable means 32 has a diameter less than the flange opening 22. The flange hole 22 includes a counterbored opening 23 large enough to accommodate the removable means collar 36 and a through hole 27 of a diameter larger than the cylindrical extension 38.

The rim hole 20 includes a through hole 28 into which the stud 34 is pressed and a larger counterbored opening 29 with which the air passage 60 communicates. The counterbored opening 29 has diameter large enough to accept the "0"-ring 33 and preferably is smaller than the flange through hole 27.

Figure 5:
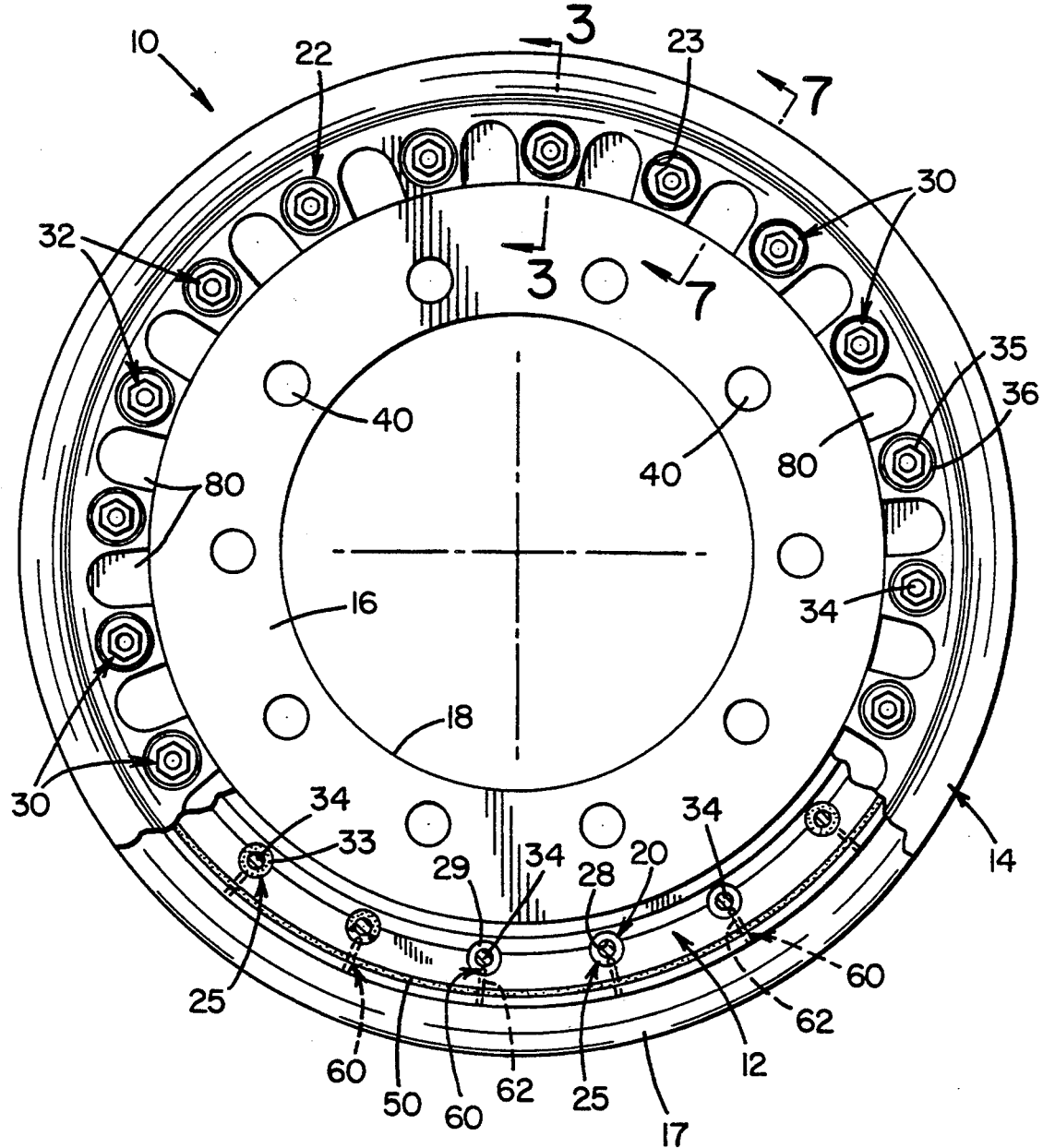
FIG. 5 is a first side view of the wheel assembly.
Figure 6:
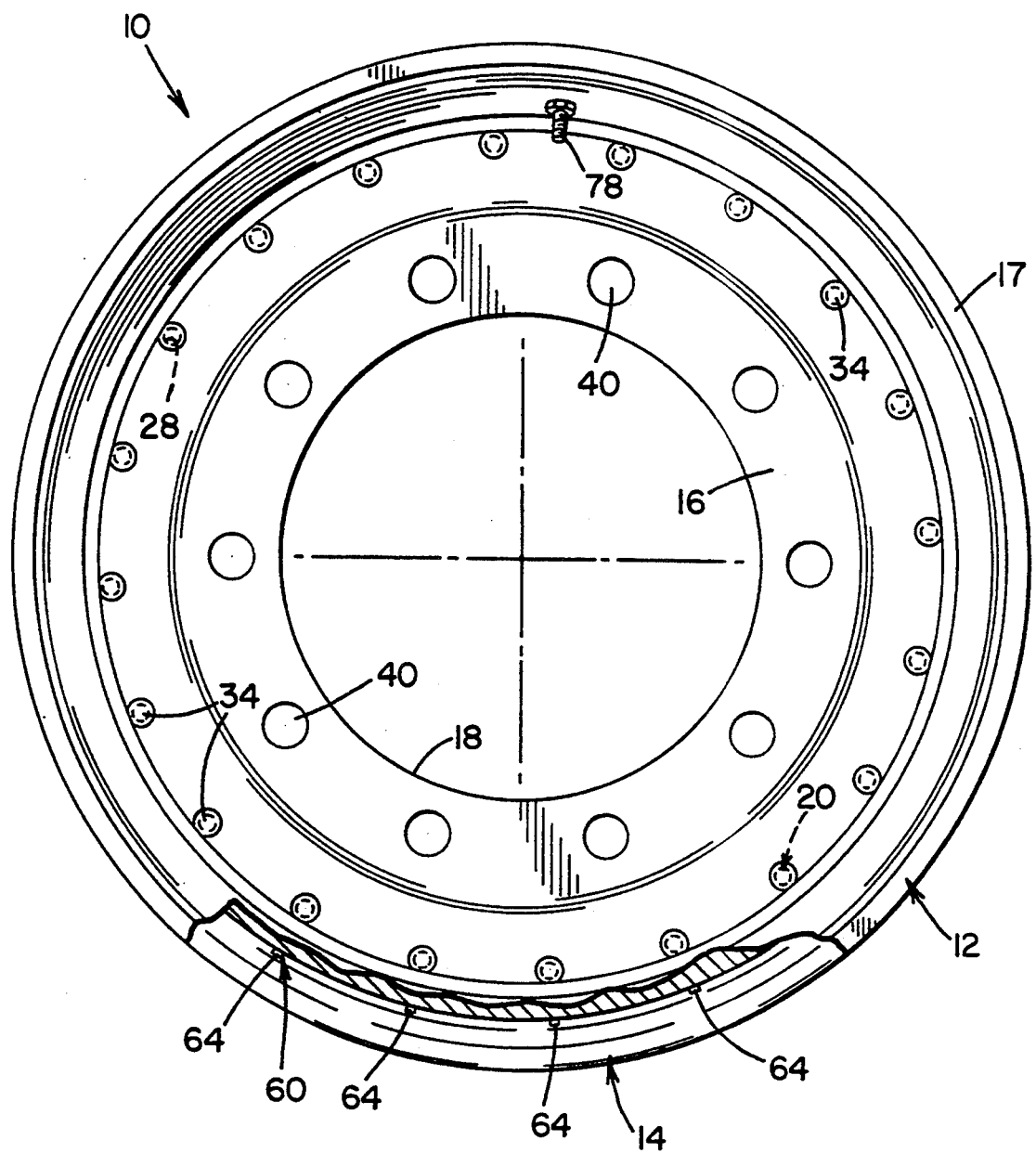
FIG. 6 is a second or opposite side view of the wheel assembly.
Figure 7:
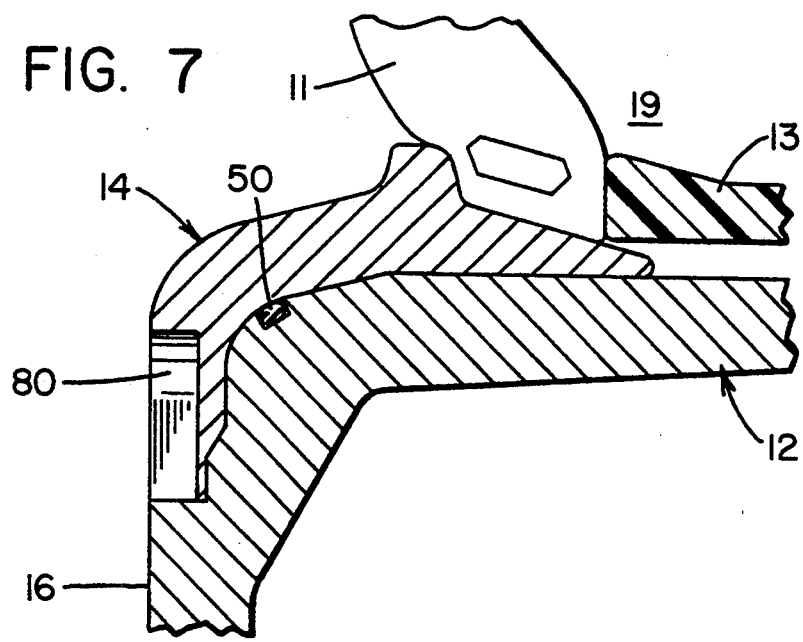
FIG. 7 is an enlarged view of a portion of the wheel assembly, the view being taken from FIG. 5 along lines 7—7.
Figure 8:
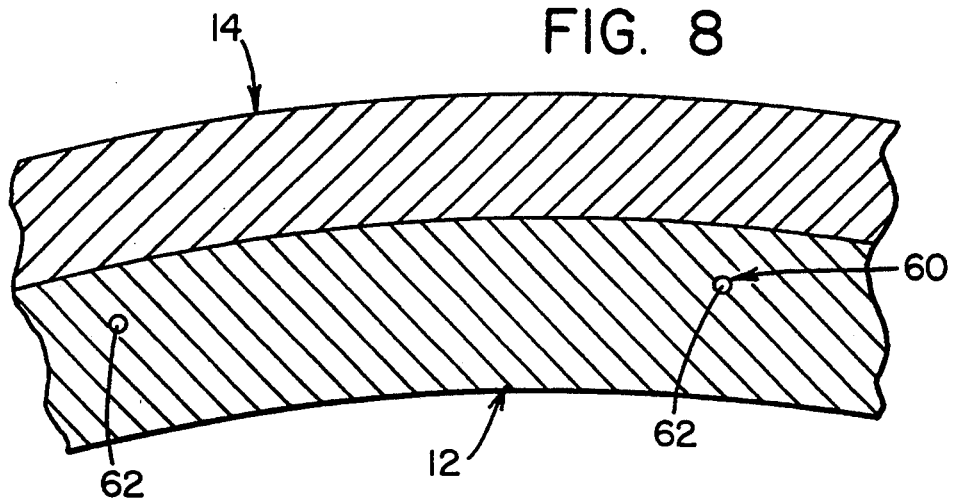
FIG. 8 is a view of the removable flange and rim taken from FIG. 3 along lines 8—8.
Figure 9:
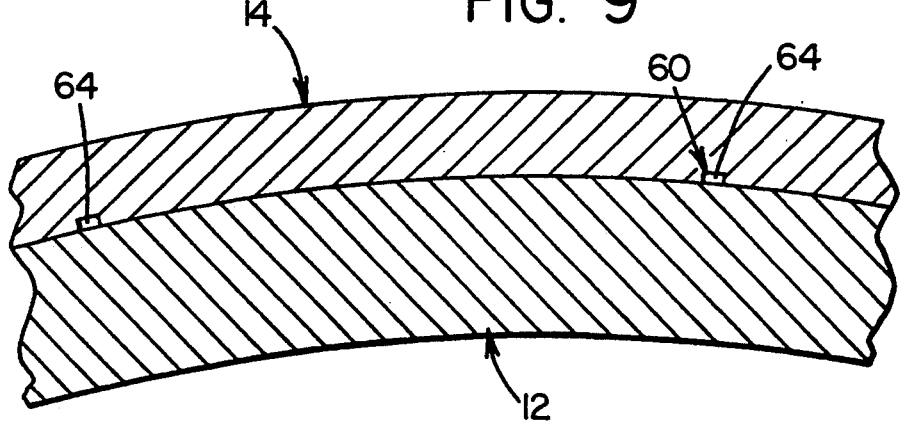
FIG. 9 is a view of the removable flange and rim taken from FIG. 3 along lines 9—9.

FIG. 5 and 6 show the side views of the wheel assembly 10. In FIG. 5 is a view looking at the removable flange side of the assembly. The view shows a typical pattern of hub attachment holes 40 and the large central opening 18 of the rim 12. A portion of the removable flange 14 with spaced means 30 is shown. Interposed between each means 30 is a slot 80. The slot 80 is of sufficient size to accommodate the hexagonal head 35 of the removable means 32, the head 35 being adapted to nest within the flange slot 80. This feature is particularly useful when dual wheel mounting is required. As shown in FIG. 10 a pair of wheel assemblies 10 can be tandemly mounted to a vehicle hub. A portion of each of the means 30 for securing the removable flange and pressure relieving nests within a flange slot 80 of the opposite wheel assembly. The axial ends 16 of the rim assemblies 10 abut each other. The mounting holes of each wheel are located so that, when end 16 of the two wheels abut, the mounting holes align and the means 30 of each wheel are in the slots 80 of the other wheel. As further shown in FIG. 7, the removable flange 14 is axially aligned with or inward of the axial extent of the rim's axial end 16.

In FIG. 5, a portion of flange 14 is removed and the annular seal 50 is shown interposed between the flange and the rim. Six of the openings 25 are revealed. The stud 34 with an "0"-ring 33 is illustrated at three of the openings 25. In one such opening 25 the "0"-ring 33 is partially cut away illustrating the airway passage 60. In the three remaining exposed openings 25 the stud 34 with airway passage 60 is shown without "0"-rings 33.

Preferably twenty spaced means 30 are used for securing the flange and relieving pressurization from an inflated tire, but a greater or lesser number can be incorporated into the design. It is recommended that at least four and preferably six or more such means be utilized. In any event the number of means must be adequate to reduce tire pressure prior to dislodgement of the flange.

FIG. 6 is a view of the wheel assembly 10 opposite to the view of FIG. 5, the view in FIG. 6 looking toward the side of the rim 12 having integral flange 17. The press fit attachment of the studs 34 to the rim 12 is illustrated, as well as a partial sectional view of the wheel assembly 10 exposing the airpassage slots 64 in the removable flange 14.

I claim:

1. A wheel assembly for a tubeless pneumatic tire, the wheel assembly comprising:

a rim for supporting the tire;

a flange, removably attached to the rim, for engaging a bead area of the tire, the assembled rim and flange together with the tire forming an air tight chamber for pressurization; and a plurality of spaced means for securing the flange to the rim and relieving pressurization from a mounted and inflated tire, the spaced means for securing and relieving pressurization including a removable means for applying axial force between the flange and the rim, upon loosening of one of the removable means depressurization of the tire is initiated.

2. The wheel assembly of claim 1, wherein the rim and the flange have a plurality of circumferentially spaced holes, the holes of the rim being aligned with the holes of the flange to form a plurality of openings extending from flange to rim and wherein the securing and pressure relieving means comprises removable means for applying an axial force between the rim and the flange to secure the flange to the rim, one of the removable means being located in each of the respectively aligned flange and rim holes.

3. The wheel assembly of claim 2, wherein the securing and pressure relieving means further comprises a plurality of air passages communicating with the air chamber and the openings, and wherein each of the means for securing and pressure relieving includes means for air tight sealing and unsealing of the air passage communicating with the opening in which the removable means is located upon secure assembly and disassembly of the flange to the rim.

4. The wheel assembly of claim 2, wherein the removable means for securing the flange to the rim comprises a threaded stud attached to the rim and a removable nut.

5. The wheel assembly of claim 3 wherein the means for sealing the air passage comprises an elastomeric "O"-ring.

6. The wheel assembly of claim 1, further comprising an annular seal, the annular seal being located between the removable flange and the rim.

7. The wheel assembly of claim 1, wherein the assembly comprises at least four spaced means for securing the flange to the rim and relieving pressurization.

8. The wheel assembly of claim 7 wherein the assembly comprises at least six spaced means for securing the flange to the rim and relieving pressurization.

9. The wheel assembly of claim 8 wherein the assembly comprises 20 spaced means for securing the flange to the rim and relieving pressurization.

10. The wheel assembly of claim 1 wherein dismounting an inflated tire from the wheel assembly requires deflation via the spaced means prior to unsecuring the flange from the rim.

11. An assembly of two wheels as defined in claim 3, each wheel having a central portion with a plurality of mounting holes for attaching the wheel assembly to a vehicle, one of the wheels having its central portion abutting the central portion of the second wheel, a portion of each of the removable means of each wheel fitting in a slot of the other wheel.

12. The wheel assembly of claim 11 wherein the slots are located between adjacent openings formed by the flange and rim holes and are radially aligned with the openings.

13. The wheel assembly of claim 1 wherein the wheel assembly further includes a bead retaining device, the device being positioned between beads of a tire mounted to the wheel assembly.

* * * * *